(12) United States Patent  
Shaw et al.

(10) Patent No.: US 7,464,343 B2  
(45) Date of Patent: Dec. 9, 2008

(54) TWO LEVEL HIERARCHY IN-WINDOW GALLERY

(75) Inventors: Han-Yi Shaw, Redmond, WA (US); Nicolas Trescases, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 429 days.

(21) Appl. No.: 11/261,273

(22) Filed: Oct. 28, 2005

(65) Prior Publication Data

US 2007/0101299 A1  May 3, 2007

(51) Int. Cl.  
*G06F 14/00* (2006.01)  
*G06F 15/00* (2006.01)

(52) U.S. Cl. ...................................... 715/850; 715/853
(58) Field of Classification Search ......... 715/700–763, 715/765, 853, 850, 854, 851; 707/10, 1  
See application file for complete search history.

(56) References Cited

U.S. PATENT DOCUMENTS

| | | | |
|---|---|---|---|
| 6,232,972 | B1 | 5/2001 | Arcuri et al. |
| 6,727,919 | B1 | 4/2004 | Reder et al. |
| 6,857,105 | B1 | 2/2005 | Fox et al. |
| 6,909,443 | B1 | 6/2005 | Robertson et al. |
| 7,054,870 | B2 * | 5/2006 | Holbrook ..................... 707/10 |
| 2002/0070977 | A1 | 6/2002 | Morcos et al. |
| 2002/0152267 | A1 * | 10/2002 | Lennon ....................... 709/203 |
| 2003/0107597 | A1 | 6/2003 | Jameson |
| 2004/0183830 | A1 | 9/2004 | Cody et al. |
| 2005/0039144 | A1 | 2/2005 | Wada et al. |
| 2005/0097465 | A1 | 5/2005 | Giesen et al. |
| 2005/0193090 | A1 | 9/2005 | Ingram et al. |

OTHER PUBLICATIONS

Steven Bink, "PDC: Microsoft replaces menu bar with feature docks", Sep. 15, 2005, Bink.nu, http://bink.nu/Article4838.bink.
Nevron LLC, "Nevron User Interface Suite v4.0—Beta", http://windowsforms.net/ControlGallery/ControlDetail.aspx?Control=670&tabindex=9, Microsoft Corporation, 2003.
Kirill Grouchnikov, "Who, who does not want to wear a ribbon?" Kirill Grouchnikov's Blog, http://weblogs.java.net/blog/kirillcool/archive/2005/09/who_does_not_wa.html, Sun Microsystems, Inc. 1995-2005.
Rick Jelliffe, "Command Tabs: A Ribbon Interface in Java", http://www.windowsdevcenter.com/pub/wlg/7976, O'Reilly Media, Inc., 2000-2005.

* cited by examiner

*Primary Examiner*—Kevin Nguyen  
(74) *Attorney, Agent, or Firm*—Vierra Magen Marcus & DeNiro LLP

(57) ABSTRACT

A graphical user interface is disclosed which allows users to interface with a computer operating system and/or application programs running in conjunction with the operating system. For an Office-style suite application program, a gallery bar may be displayed under the main task row of functions. The gallery bar has a first tier of tabs, where each tab corresponds to a high level formatting option associated with the current application program being used from the suite. When a user selects one of the first level tabs, a row of second level tabs is provided for the first selected tab. These second level tabs provide users with a simple range of functionality associated with the user's most commonly used formatting tasks. A gallery of thumbnail templates of various document types or other categories is also displayed in association with the second level options. These gallery thumbnails provide an easy and engaging manner for discovering and using advanced features in the Office suite of application programs.

16 Claims, 7 Drawing Sheets

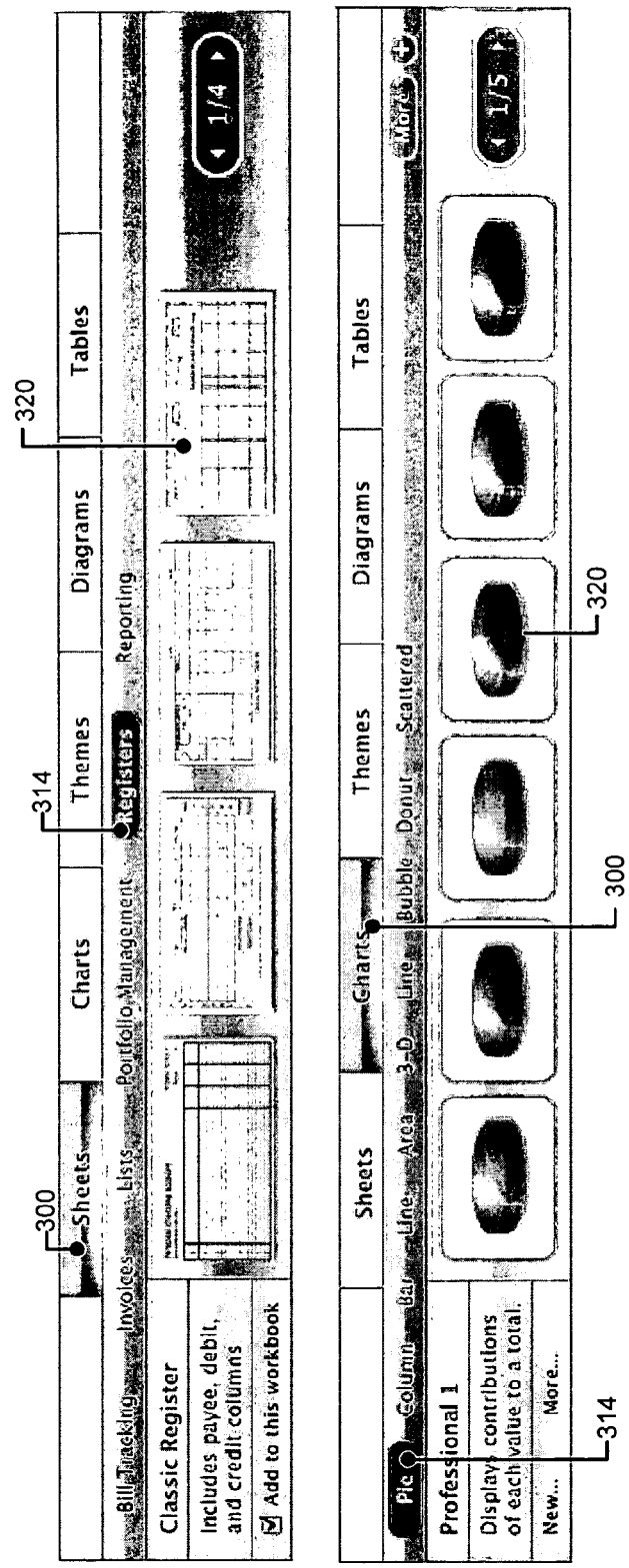

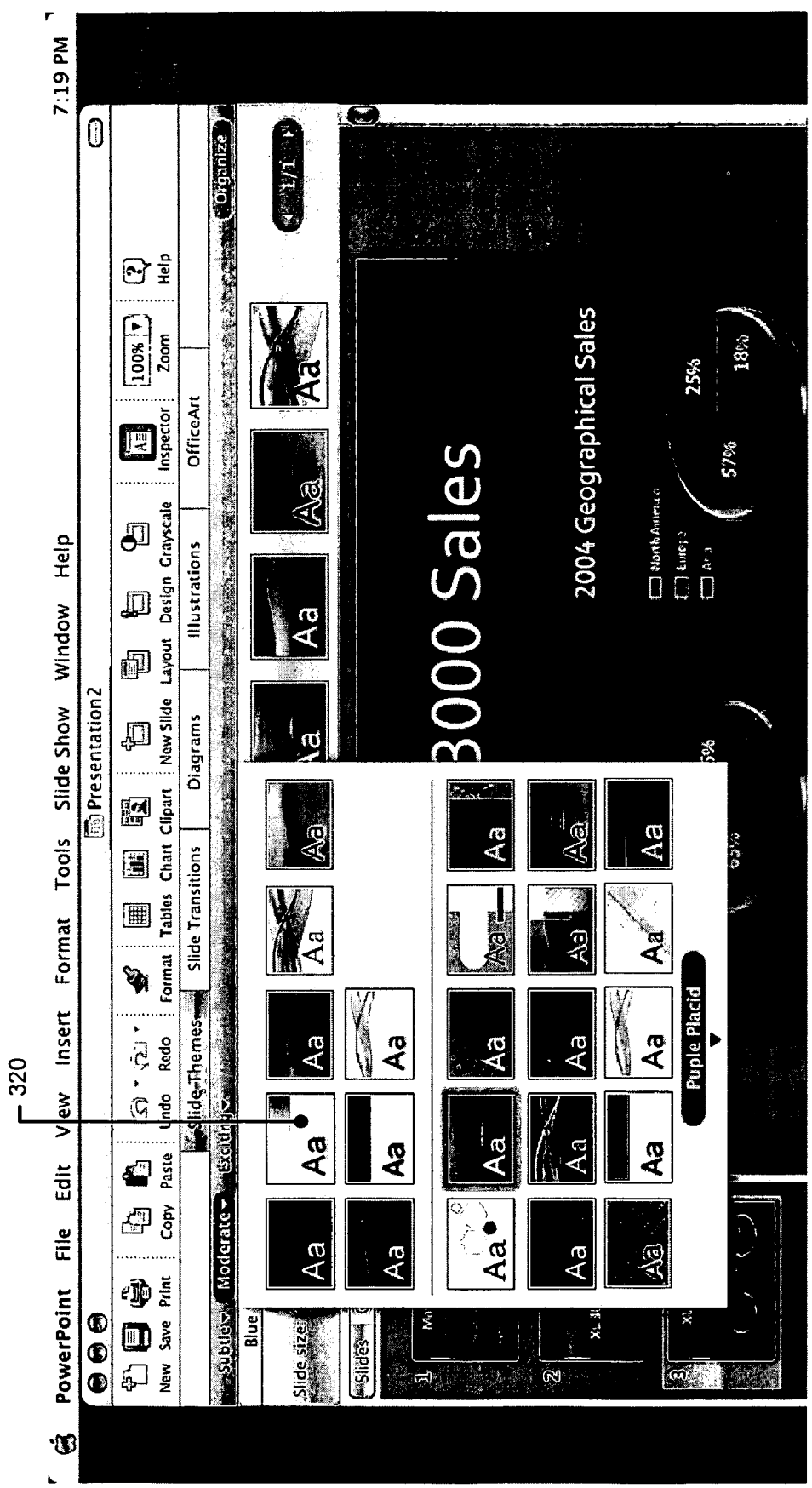

TWO LEVEL HIERARCHY IN-WINDOW GALLERY

BACKGROUND

1. Field of the Present System

The present system is directed to a graphical user interface allowing users to interface with a computer operating system and/or application programs running in conjunction with the operating system.

2. Description of the Related Art

Computer operating systems frequently employ a graphical user interface ("GUI") to convey information to users over a display by various combinations of graphical items, such as icons, text, drop-down menus, dialog boxes, and toolbars. A GUI provides an interface to the operating system, and to application programs running in conjunction with the operating system. The goal of most user interfaces is to provide a rich user experience where the user can quickly and easily access a wide variety of operating system and/or application program functions.

A common example of a GUI is a drop-down menu, which organizes numerous computer operations into major headings and displays the headings across the top of a display screen. The headings each contain a menu that drops down when the heading is clicked to allow access to the operations listed in the drop-down menu. The operations may be tools, controls, commands, macros, procedures, etc. Another typical example of a GUI is a toolbar, which directly displays and allows access to operating systems and/or application program operations. Toolbars comprise a series of buttons arranged along a bar. Typically, a toolbar is disposed along the top of an application program window, although it may also be docked along another side or even may be free floating.

Drop-down menus and toolbars comprise a large portion of the GUI for known application programs such as Microsoft Word, Excel® and PowerPoint®. And within these application programs, many drop-down menu and toolbar features are directed to the formatting of documents. Traditionally, formatting functions control the way a document looks, for example the font, size and style of text in Word documents, the layout of spreadsheets in Excel, and the animation of slides in PowerPoint presentations. However, as the capabilities of these application programs have increased with each version, many more objects have been added to the formatting drop-down menu and toolbar. As a result, the formatting menu and toolbar in these application programs have become quite large. In some instances, the objects which have been added to the formatting menu and/or toolbar may not relate strictly to formatting, but have been placed there as a logical position for access by users.

While the expanded capability of the formatting options has made for a richer overall user experience, it may also happen that some formatting features become obscured in current formatting menus and toolbars. Moreover, as new formatting features are added to create even greater formatting functionality, users would benefit from a user interface which is easy to use and which provides quick access to a vast array of formatting options.

SUMMARY

The present system, roughly described, relates to a graphical user interface allowing users to interface with a computer operating system and/or application programs running in conjunction with the operating system. For an Office-style suite application program, a gallery bar may be displayed under the main task row of functions. The gallery bar has a first tier of tabs, where each tab corresponds to a high level formatting option associated with the current application program being used from the suite. When a user selects one of the first level tabs, a row of second level tabs is provided for the first selected tab. These second level tabs provide users with a simple range of functionality associated with the user's most commonly used formatting tasks. A gallery of thumbnail templates of various document types or other categories is also displayed in association with the second level options. These gallery thumbnails provide an easy and engaging manner for discovering and using advanced features in the Office suite of application programs.

The GUI described herein can be implemented on a variety of processing systems, including computers and hand-held devices such as personal digital assistants and mobile telephones. When running an Office-style suite application program, the gallery graphical user interface may be launched from a drop-down menu or toolbar appearing on the GUI window of the application program. Once launched, the GUI according to the present system may present a gallery as a user interface.

In embodiments, the first level hierarchy may relate to high level formatting categories which may be specific to the Office-type suite application program then running on the user's system and/or global to a variety of Office-type suite application programs. Upon selection of a first level button, a group of second level hierarchy tabs for the selected first level button is displayed. One of the second level hierarchy tabs may be selected, and a group of thumbnail templates for the selected second level hierarchy may be displayed. Moving the screen cursor over the displayed thumbnail templates may display or perform the function of the various thumbnails. A user may select one or more of the thumbnails to include the thumbnail's formatting operation in a work such as a document, spreadsheet or presentation.

It is a further feature of the present system that the second level buttons and gallery thumbnails may be customized. In one embodiment, the order in which the second level buttons and/or the order in which the gallery thumbnails are displayed may be changed by clicking and dragging the second level buttons and/or thumbnails to different locations in the gallery. Moreover, the gallery may be further customized by providing users with the options to add additional gallery thumbnail templates. When a user repositions a button in the gallery of a first application program, that button may similarly be repositioned when the user opens the gallery in other application programs. Thus, a user may customize the gallery in a single application program, and have that customization carried through to galleries in other application programs.

DESCRIPTION OF THE DRAWINGS

FIGS. 5 through 14 illustrate various examples of the graphical user interface according to the present system.

FIG. 15 is a depiction of an alternative graphical user interface according to the present system.

DETAILED DESCRIPTION

The present system will now be described with reference to FIGS. 1 through 15, which in embodiments relate to a graphical user interface allowing users to interface with a computer operating system and/or application programs running in conjunction with the operating system. The present system may operate over a wide variety of operating systems using user interfaces, including for example the Macintosh operating system by Apple Computer, Inc., the Windows® operating system from Microsoft Corporation, and the Linux operating system.

Embodiments of the present system in general relate to a two tier graphical user interface that enables the majority of formatting features to be discovered by users in an efficient and easy to use way. More specifically, for an Office-style suite application program, such as for example Word, Excel® and/or PowerPoint®, a gallery bar is displayed under the main task row of functions. The gallery bar has a first tier of tabs, where each tab corresponds to a user template or major user activity associated with the current application program being used from the suite. When a user selects one of the first level tabs, a row of second level options is provided for the first selected tab. These second level options provide a user with a simple range of functionality associated with the user's most commonly used tasks. A gallery of thumbnails of various document types or other categories is also displayed in association with the second level options. These gallery thumbnails provide an easy and engaging manner for discovering and using advanced features in the Office suite of application programs. The user interface according to the present system can be contextually adjusted for any suite application program, e.g., word processing, presentation, spreadsheet, or other application program types.

Figure 1:
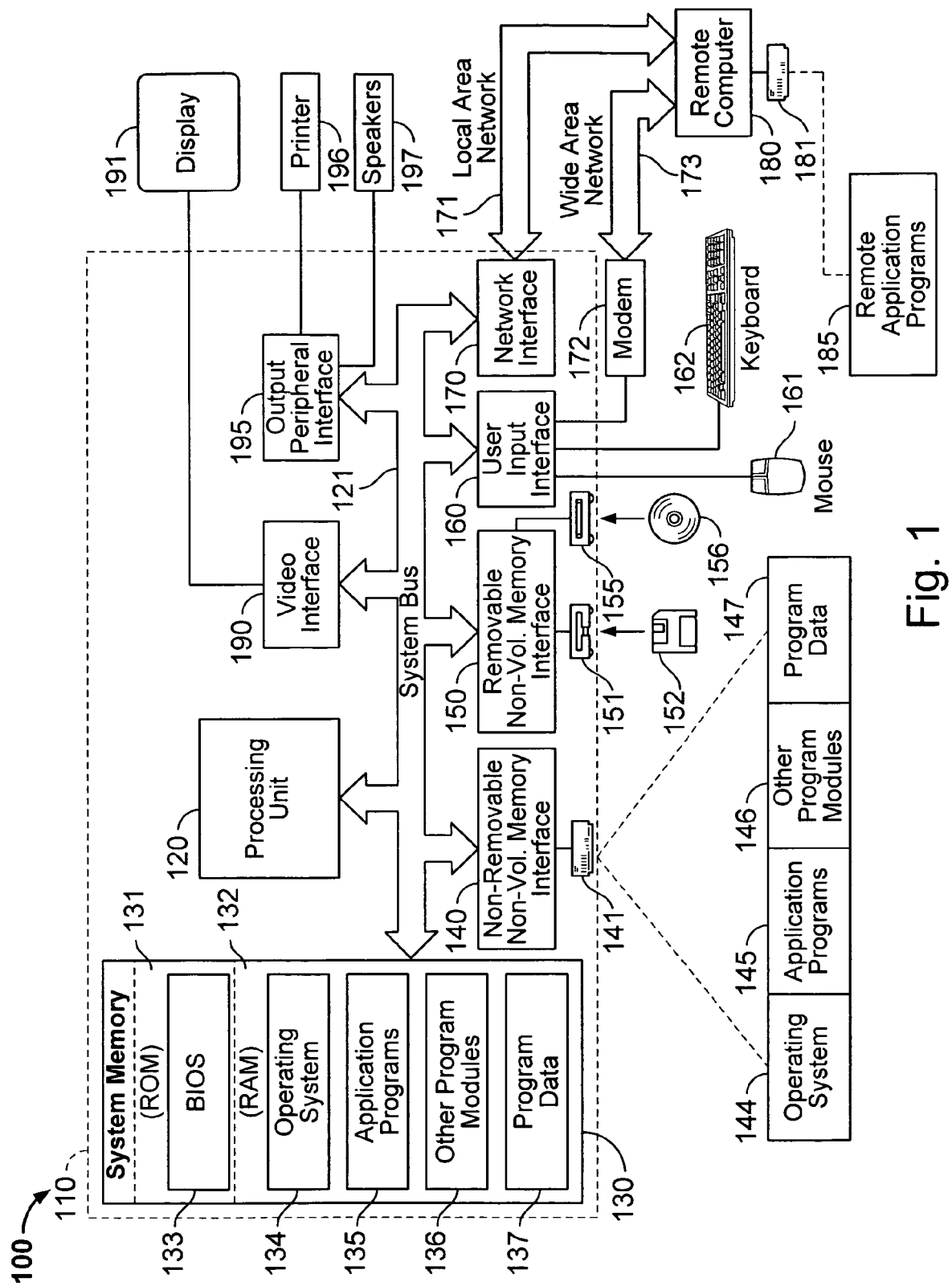
FIG. 1 is a block diagram of computer hardware for implementing embodiments of the graphical user interface according to the present system.

The GUI described herein can be implemented on a variety of processing systems. FIG. 1 illustrates an example of a suitable general computing system environment 100 on which the present system may be implemented. The computing system environment 100 is only one example of a suitable computing environment and is not intended to suggest any limitation as to the scope of use or functionality of the system. Neither should the computing system environment 100 be interpreted as having any dependency or requirement relating to any one or combination of components illustrated in the exemplary computing system environment 100.

The present system is operational with numerous other general purpose or special purpose computing systems, environments or configurations. Examples of well known computing systems, environments and/or configurations that may be suitable for use with the present system include, but are not limited to, personal computers, server computers, multiprocessor systems, microprocessor-based systems, set top boxes, programmable consumer electronics, network PCs, minicomputers, mainframe computers, laptop and palm computers, hand held devices including personal digital assistants and mobile telephones, distributed computing environments that include any of the above systems or devices, and the like.

The present system may be described in the general context of computer-executable instructions, such as program modules, being executed by a computer. Generally, program modules include routines, programs, objects, components, data structures, etc., that perform particular tasks or implement particular abstract data types. The present system may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the present system includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, and removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read only memory (ROM), electrically erasable programmable read-only memory (EEPROM), flash memory or other memory technology, CD-ROM, digital versatile disks (DVD) or other optical disk storage, magnetic cassettes, magnetic tapes, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, DVDs, digital video tapes, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. These components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The application programs 135 stored in system memory 130 may include the GUI for performing the present system as described hereinafter. When one of the application programs including the GUI of the present system is launched, it runs on the operating system 134 while executing on the processing unit 120. An example of an operating system on which the application programs including the present GUI may run is the Macintosh operating system by Apple Computer, Inc., but the application programs including the present GUI may operate on a variety of operating systems including also the Windows® operating system from Microsoft Corporation, or the Linux operating system. The application programs including the present GUI may be loaded into the memory 130 from the CD-ROM drive 155, or alternatively, downloaded from over network 171 or 173.

The present system will now be described in reference to the flowchart of FIG. 2 and sample screen depictions of FIGS. 3 through 15. When running an Office-style suite application program, the gallery graphical user interface may be launched in a step 200 from a drop-down menu or toolbar appearing on the GUI window of the application program. For example, the gallery may appear as an option under the View drop-down menu, which may be launched by clicking on View, and then Gallery with the pointing device.

Figure 3:
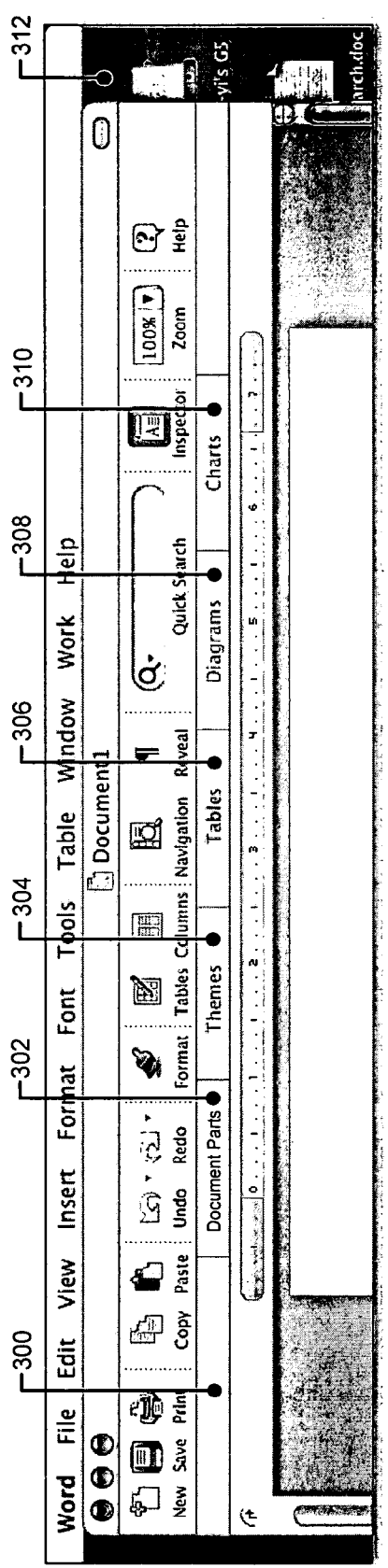
FIG. 3 is a depiction of a portion of a window including a graphical user interface according to the present system in a closed state.

Once launched, the GUI according to the present system may present a gallery as a user interface as shown for example in FIG. 3. The gallery shown in FIG. 3 is shown in the "closed" state, where just a first level hierarchy 300 is shown including a group of tabs or buttons 302 through 310. In embodiments, the first level tabs 302 through 310 are near the top of a window 312 of an Office-type suite application program. It is understood that the first level tabs 302 through 310 and the user interface gallery in general may be located on other portions of window 312 in alternative embodiments of the present system.

In embodiments, the first level hierarchy 300 may relate to high level formatting categories which may be specific to the Office-type suite application program then running on the user's system and/or global to a variety of Office-type suite application programs. In the embodiment shown in FIG. 3, the application program is a word processing application program. For such an application program, the first level hierarchy 300 may include buttons 302 through 310 relating to document parts (the constituent parts of a document), themes (a set of unified design elements and/or color schemes), tables, diagrams and/or charts. It is understood that a wide variety of other first level buttons may be included in first level hierarchy 300 in addition to or instead of buttons 302 through 310. In embodiments, there may be seven or less first level buttons fitting within the horizontal length of window 312. It is understood that more than seven first level tabs may be provided, all of which may or may not fit entirely within window 312 at the same time in alternative embodiments. First level tabs for a given application program may be determined by the author of the application program. In alternative embodiments, the first level tabs may additionally or alternatively include after market third party templates or user-defined templates.

In a step 202, the GUI software according to the present system may check to see if the screen cursor, driven by the pointing device, is positioned over one of the first level buttons. If not, the gallery remains in the closed position shown in FIG. 3 (step 204). If, however, the screen cursor is positioned over one of the buttons 302 through 310, that button may be highlighted in a step 206. Highlighting may be any visual enhancement of the buttons, including a shading of the button (as shown for example with the document parts button in FIG. 4), bolding of text of a button or other visual indicator. Highlighting may also include magnifying the displayed contents of the button over which the cursor is positioned. Step 206 may be omitted in alternative embodiments so that the buttons 302 through 310 are not highlighted when accessed by the cursor.

The GUI software next determines whether a first level button has been selected in step 208. If not, the software returns to step 202 to determine whether the cursor is positioned over one of the buttons. However, if a first level button is selected in step 208 by clicking or otherwise actuating the pointing device with the cursor positioned over one of the buttons, a group of second level hierarchy tabs for the selected first level button is displayed in step 210, and as shown in FIG. 4.

Figure 4:
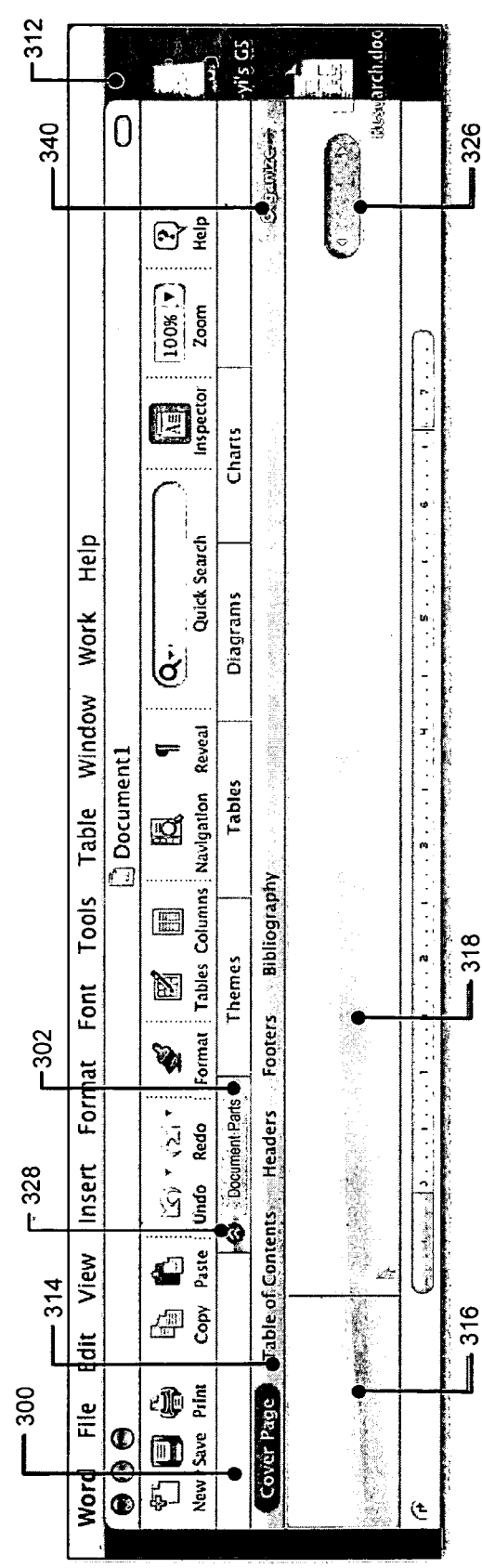
FIG. 4 is a depiction of a portion of a window including a graphical user interface according to the present system in an open state.

In the example of FIG. 4, the user selected the document parts button 302 from the first level hierarchy 300. In this example, selection of that first level button may produce a plurality of second level buttons 314 providing subcategories of the selected first level button. For example, selection of the document parts button 302 may produce second level buttons for different portions of a document, such as for example cover page, table of contents, headers, footers, and bibliographies. It is understood that a variety of other second level buttons 314 may be provided for a document parts button. It is further understood that selection of one of the other first level buttons 304 through 310 would produce a second level 314 of buttons relating to subcategories of the selected first level button.

Upon selecting a first level button, in addition to presenting a group of second level buttons 314, the GUI of the present system may further present a window beneath the second level buttons 314 including a controls region 316 and a gallery thumbnail region 318. In the embodiment shown in FIG. 4, the controls region 316 and gallery thumbnails region 318 are shown blank in order to illustrate a feature of the present system. That is, a gallery according to the present system may be presented with a semi-transparent appearance. Thus, as seen for example in the lower right-hand corner of FIG. 4, the window 312 may be partially visible behind the gallery. This semi-transparent appearance is intended in part to create a glass-like impression of the gallery over the window 312. Regions 316 and 318 may further be provided with background lines and textures creating the impression of streaks, such as streaks that may appear on real glass, to accentuate the glass-like quality of the gallery.

Instead of controls region 316 and gallery thumbnail 318 being left blank, upon the initial selection of a first level button 300 and opening of the second level 314, the second level buttons 314 may be presented with the first button in the group already highlighted. In such an embodiment, the region 318 may be populated with gallery thumbnails 320 (FIG. 5), in a step 212, for the highlighted first button in the second level hierarchy 314. The controls region 316 may also display a title 322 of the one or more thumbnails 320 (step 214), as well as a description 324 of the one or more thumbnails 320 (step 216). The title 322 and description 324 may dynamically change as the user moves the cursor over different gallery thumbnails 320.

Figure 5:
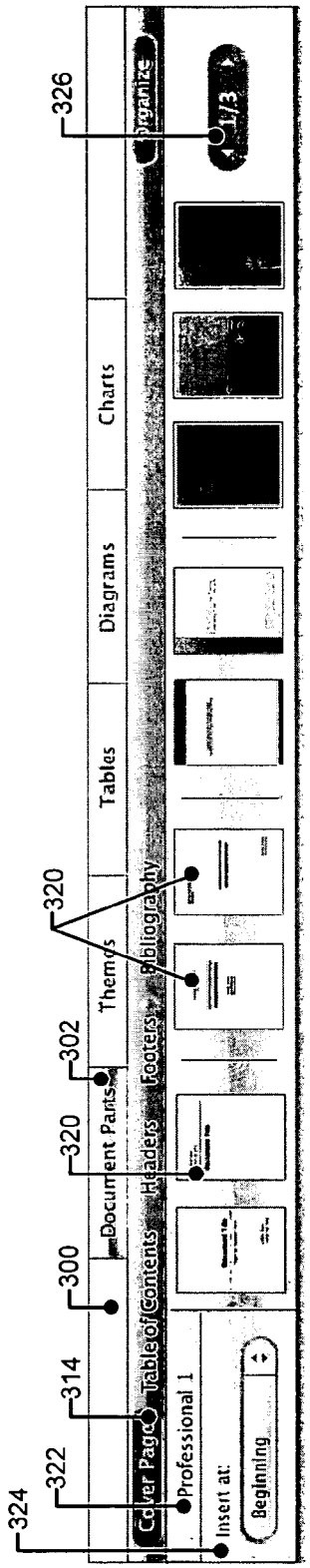

As shown in FIG. 5, the first button of the second level 314 may for example be a cover page, in which case gallery thumbnails 320 would be various templates for various cover pages. The title of one or more of these cover pages may for example be "professional 1" and a description 324 may for example indicate that the cover pages are inserted at the beginning of the document. As shown, the description box 324 may include a drop-down menu with more than one option for the user to format the selected second level feature as desired.

FIG. 5 further illustrates a scroll button 326. Various numbers of templates may be provided in gallery thumbnails 320, all of which may not fit on the screen at the same time. By using scroll button 326, a user may scroll through the various gallery thumbnails 320 for each second level tab 314 as desired.

Figure 6:
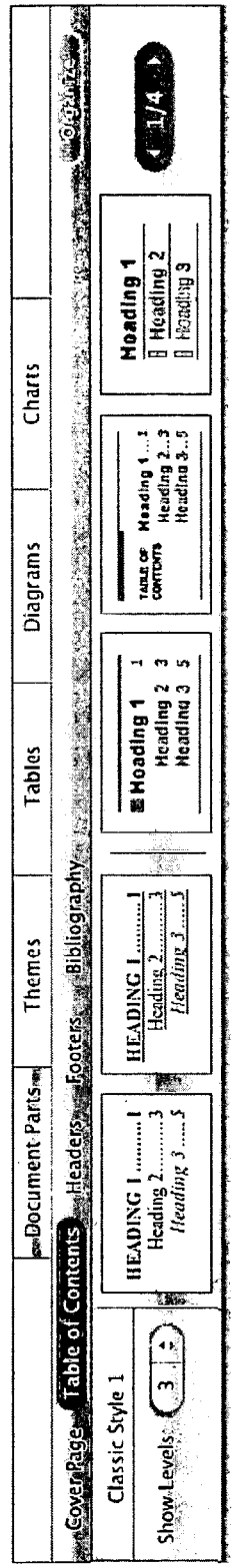
Figure 7:
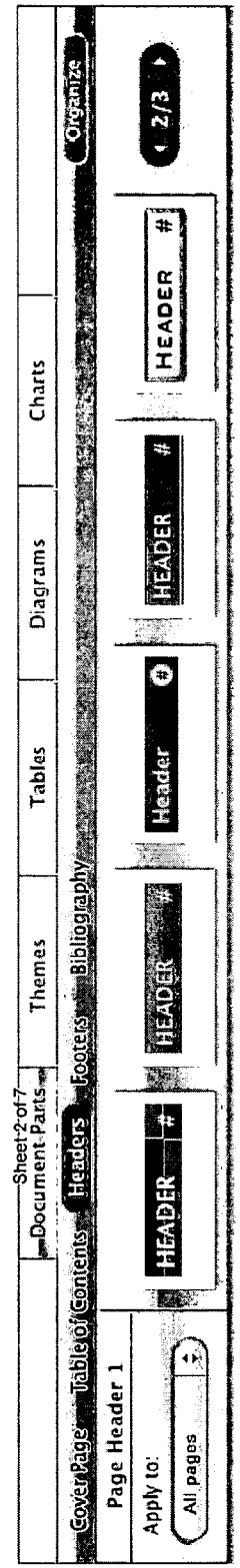
Figure 8:
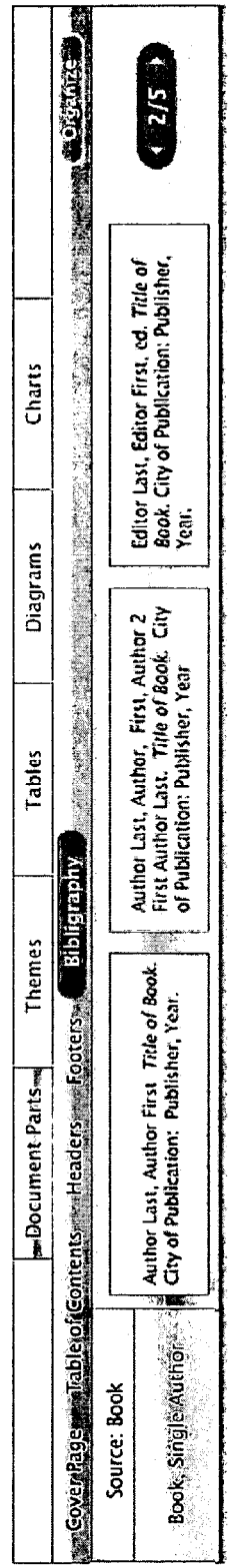
Figure 11:
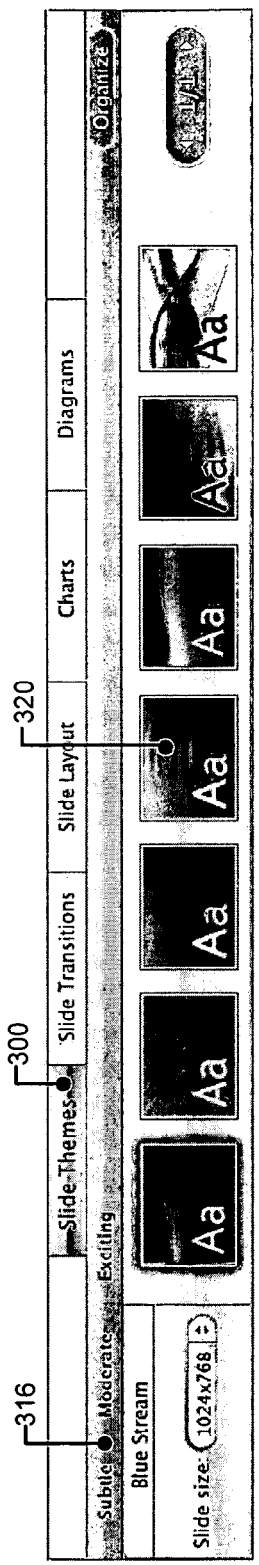
Figure 12:
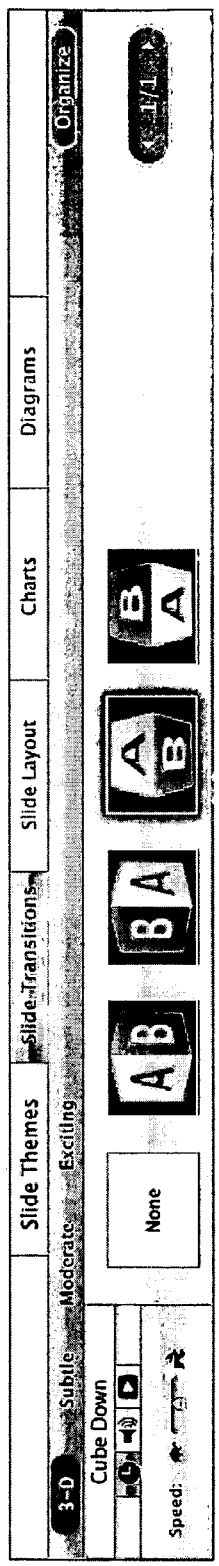
Figure 13:
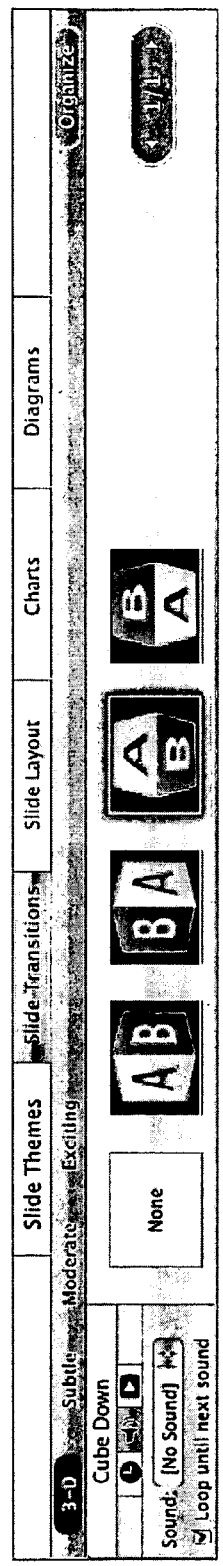
Figure 14:
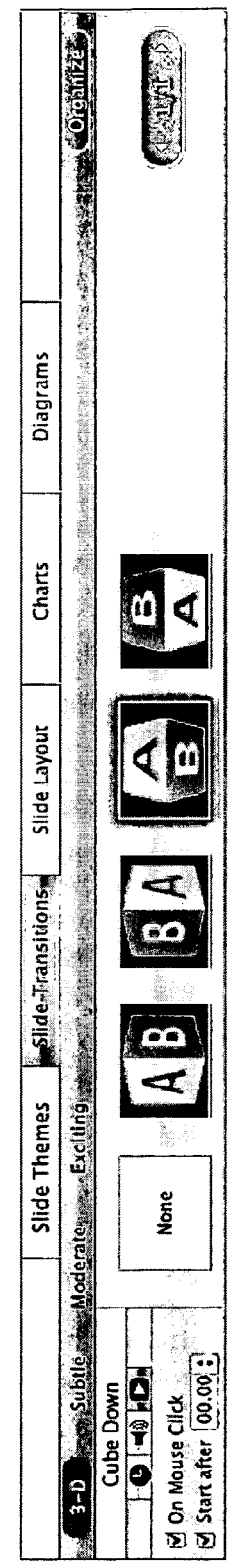

FIGS. 6 through 8 show additional examples of different gallery thumbnails 320 which may be provided under the different second level buttons 314 for the selected first level button 300. FIG. 6 shows various examples of gallery thumbnail templates for tables of contents. FIG. 7 shows gallery thumbnail templates for different headers. And FIG. 8 shows different gallery thumbnail templates for different bibliography formats. Those of skill in the art will appreciate that FIGS. 5 through 8 are by way of example only, and are by no means limiting on the present system. It is to be appreciated that a wide variety of different second level buttons 314, gallery thumbnails 320, titles 322 and descriptions 324 may be provided by the GUI of the present system to allow users to quickly and easily select a desired format for their document.

Once the first and second level hierarchies are displayed in a gallery along with the gallery thumbnail templates as shown in FIGS. 5 through 8, the user may perform a variety of steps to interact with the GUI. For example, referring again to a flowchart of FIG. 2, the user may choose to close the gallery in a step 218 by again clicking on the object from the drop-down menu or toolbar used to launch the gallery. Closing the gallery gives the user the ability to collapse the gallery when not in use (step 220). Alternatively, the user may choose to close the earlier selected first level hierarchy tab in a step 222 via a button 328 on the first level hierarchy tab, as shown for example in FIG. 4. Upon closing of the selected first level hierarchy, the second level hierarchy and regions 316 and 318 will collapse and the GUI will once again appear as shown in FIG. 3. The software may then return to step 202 to wait for a cursor over one of the first level buttons 300.

As a further option, the user may move the cursor over one of the first level buttons while the selected first level button remains open (step 224). In such an instance, the first level button over which the cursor is located may be highlighted as explained above (step 225). The previously selected first level button may also remain highlighted, but the highlighting of the earlier first level button may turn off upon placement of the cursor over a different first level button in alternative embodiments.

A user may alternatively click and select (i.e., click and release the pointing device) a new first level button in step 226. In such an instance, the GUI software may once again perform steps 210 through 216 for the newly selected first level button. That is, upon selecting the new first level button, the GUI may present a new group of second level buttons in step 210, a new group of gallery thumbnails 320 in a step 212, a title 322 of the one or more new thumbnails in step 214, as well as a description 324 of the one or more new thumbnails in step 216.

Instead of clicking and selecting a new first level button, the user may instead click and select a new second level button in step 228. In such an embodiment, the first level button would remain unchanged, but the newly selected second level button would become highlighted and steps 212 through 216 of displaying the new thumbnails, title(s) and description(s) for the new second level button would be displayed. This possibility is illustrated in FIGS. 6 through 8 described above.

It is a further feature of the present system that the second level buttons 314 and gallery thumbnails 320 may be customized. In one embodiment, the order in which the second level buttons 314 and/or the order in which the gallery thumbnails 320 are displayed may be changed. Thus for example in step 230, one of the second level buttons may be selected and dragged to a new position in the second level hierarchy, thus reordering the second level buttons (step 232). In this way, an often used second level button may be moved to the first position. Likewise, a seldom used second level button may be demoted to a lower position. When a user performs the step 230 of clicking and dragging a second level button, the transparency of the second level button may increase during the click and drag operation.

As indicated above, some first and second level buttons in the gallery may be specific to the particular application program then in use, while other buttons may be global across a variety of application programs. In embodiments including global second level buttons, when a user repositions a button in the gallery of a first application program, that button may similarly be repositioned when the user opens the gallery in other application programs. Thus, a user may customize the gallery in a single application program, and have that customization carried through to galleries in other application programs. Similarly, once a user customizes a gallery, the gallery may remain in that appearance in subsequent user sessions. As would be appreciated by those with skill in the art, changes made to a gallery may be saved to a file accessible to the entire Office-type suite of application programs.

Instead of clicking and dragging a second level button, a user may instead opt to move the cursor over the gallery of thumbnails in a step 234. This action may serve to highlight the gallery thumbnail over which the cursor is positioned (step 236). As indicated above, upon the cursor passing over a gallery thumbnail, the gallery thumbnail may have a magnification transition animation where the thumbnail may magnify and provide greater visual detail. The thumbnail may shrink back down to size as the cursor moves away. The button to either side of the button having the cursor may also magnify slightly, thus creating a wave-impression as the cursor is moved successively over the gallery thumbnails. It is understood that the buttons to either side of the button having the cursor may not change in appearance in alternative embodiments. Moreover, the button over which the cursor is positioned may not change appearance in alternative embodiments.

In addition to highlighting a gallery thumbnail in step 236, passing the cursor over a gallery thumbnail may further demonstrate the function, operation or result of that formatting thumbnail. It is a drawback in certain "commit model" conventional systems that in order to determine the function, operation or result of a given formatting option, the user must actually add that function to his or her document. This may serve to discourage a user from selecting that formatting option. By showing a user the function, operation and/or result of a formatting option by merely passing the cursor over the gallery thumbnail for that option, a user may quickly and easily determine whether that formatting option is appropriate for his or her use.

Just as second level buttons may undergo repositioning, a user may click and drag a gallery thumbnail (step 238) to effect a repositioning of that gallery thumbnail (240). Thus, a user may further customize their gallery by placing those gallery thumbnails they use often near the front of their group, and placing those gallery thumbnails that they use less often lower in the group. When a user performs the step 238 of click and drag of a gallery thumbnail, the transparency of the gallery thumbnail may increase during the click and drag operation.

A user may scroll through various gallery thumbnail sets in a step 242 to display all of the gallery thumbnails under a given second level subgroup (step 244). For second level categories having a large number of thumbnails, in addition to scrolling though the thumbnails to view all sets, it is also possible to move a thumbnail into a group not then displayed in the gallery by dragging the thumbnail over a scroll button 326. This action will scroll through the thumbnails until the user reaches the position at which they would like to reposition the dragged thumbnail.

When a user identifies a desired thumbnail for a template the user wishes to use in his or her document, the user may click and select that gallery thumbnail in a step 246 to effect that formatting option in their document (step 248).

Figure 2:
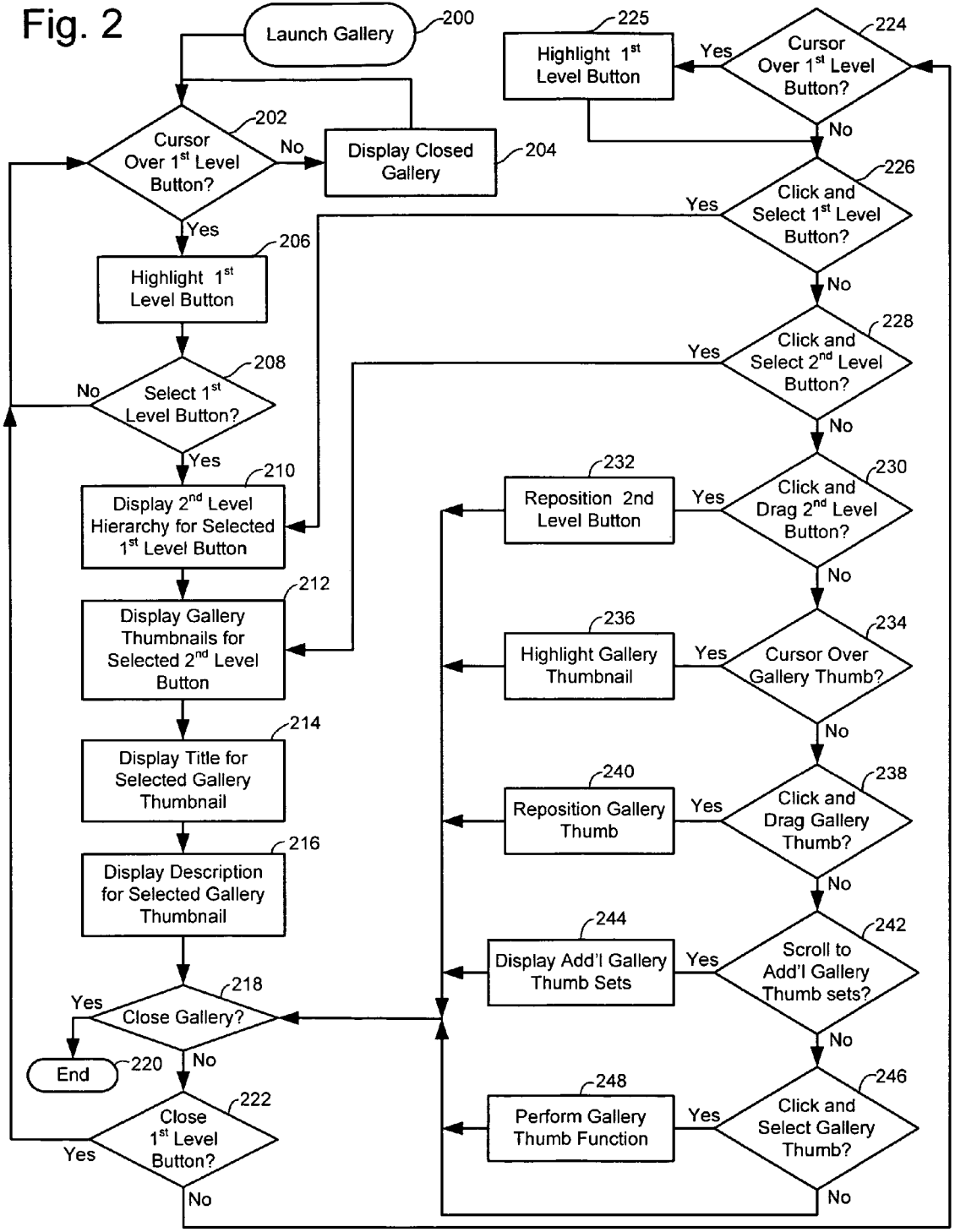
FIG. 2 is a flowchart of the operation of an embodiment of the graphical user interface of the present system.

While FIG. 2 presents a specific order of operations in the flow of the present system, it is understood that the above-described steps may be performed in different orders in different embodiments.

As indicated above, it may be possible for users to further customize their galleries by adding thumbnail templates from after-market third parties, or from templates of their own creation. A gallery may further include a button 340 (FIG. 4) for this purpose. Upon selection of button 340, the user may be guided through a series of steps allowing the user to add gallery thumbnails of his or her choosing, as well as the ability to compartmentalize those gallery thumbnails under first and second level categories of their choosing, or as designated by the after-market third party vendor.

In the embodiments described above, it is the second level buttons and the gallery thumbnails which would be customized through repositioning and the addition of new second level buttons and gallery thumbnails. It is further understood that in alternative embodiments, first level buttons 300 may also be customizable through repositioning and/or the addition of new broad categories of formatting options.

As with conventional windows, a user may resize the gallery on their window 312. In embodiments, the first level buttons, second level buttons, and/or the controls and thumbnail regions may be dynamically "center justified" as the user resizes the document window. With dynamic center justification, the gallery graphics may be maintained at the center of the resized window (until the window becomes too small to display all graphics). Alternative embodiments may operate without dynamic center justification.

FIGS. 9 through 14 illustrate additional examples of first and second level hierarchy galleries which may be presented by the GUI of the present system for formatting works such as documents, spreadsheets, drawings and presentations. FIGS. 9 and 10 show galleries for example from a spreadsheet application program such as for example Excel®. In FIG. 9, the second level button "registers" under the first level button "sheets" presents different register templates 320 for a user to format their document or spreadsheet. Controls region 316 indicates the title "classic register," referring to a highlighted gallery thumbnail, as well as a description of the register. FIG. 10 is an example of various pie chart templates which may be quickly and easily accessed through selection of the first and second level hierarchies shown.

FIGS. 11 through 14 show various galleries including themes and slide transitions for use in a presentation application program, such as for example PowerPoint®. As indicated above, by moving the cursor over a given gallery thumbnail template, the animation or other formatting effect provided by that template may be displayed to the user.

In embodiments, the present system employs only two levels of hierarchy. However, it is contemplated that the present system may employ greater than two levels in alternative embodiments of the present system.

To this point, the first level, second level, and gallery thumbnails have been described as being provided horizontally across a user's screen in single rows. It is understood that in alternative embodiments, one or more of the first level buttons, second level buttons and gallery thumbnails may be provided vertically, or in an X-Y array. For example, as shown in FIG. 15, gallery thumbnails 320 are provided both across and down the user's screen so that the user may view all of the gallery thumbnails at once. This facilitates selection of the desired template, and also allows the user to easily reposition templates in the desired order.

While the gallery described above is directed to easily and quickly performing a variety of formatting options on a work such as a document, spreadsheet, drawing or presentation, those of skill in the art would appreciate that a gallery as described above may be used to perform other functions in the preparation of a work in alternative embodiments. Similarly, while the gallery has been described above in terms of its use within an Office-type suite application program, it is to be appreciated that the gallery may also be adapted for use to perform a function within an operating system environment. For example, the gallery as described above may be used to format the look and feel of a desk top.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

We claim:

1. In a computer system having a display and a user interface selection device, a method of providing a graphical user interface on the display, comprising the steps of:
   (a) displaying a first level of categories of functions for performing an action on a displayed document or presentation;
   (b) displaying a second level of categories of functions for performing an action on the displayed document or presentation, the second level of categories of functions being subcategories of a selected first level category of functions;
   (c) displaying a visual representation of one or more functions for performing an action on the displayed document or presentation, the visual representation of one or more functions being one or more subcategories of a selected second level category of functions, and the visual representation of one or more functions providing a visual indication of the function represented by the visual representation; and
   (d) displaying at least one of a title and description of a visual representation of a function when a screen cursor controlled by a user is positioned over the visual representation of the function.

2. A method as recited in claim 1, said step (a) of displaying a first level of categories of functions comprising the step of displaying a first level hierarchy of formatting options.

3. A method as recited in claim 1, said step (b) of displaying a second level of categories of functions comprising the step of displaying a second level hierarchy of formatting options.

4. A method as recited in claim 1, further comprising at least one additional level of categories of functions above said first level of categories of functions.

5. A method as recited in claim 1, said step (a) of displaying a first level of categories of functions comprising the step of displaying seven or less buttons on the display for a user to select from.

6. A method as recited in claim 5, said step (b) of displaying a second level of categories of functions comprising the step of displaying seven or less buttons on the display for a user to select from.

7. A method as recited in claim 6, the seven or less first level categories of functions and the seven or less second level of categories of functions being displayed horizontally adjacent to each other across a length of the display.

8. A method as recited in claim 1, further comprising a step of magnifying a visual representation of a function when a screen cursor controlled by a user is positioned over the visual representation of the function.

9. In a computer system having a display and a user interface selection device, a method of providing a graphical user interface on the display, comprising the steps of:
   (a) displaying a first level of categories of formatting options;
   (b) displaying a second level of categories of formatting options, the second level of categories of formatting options being subcategories of a selected first level category of formatting options; and
   (c) displaying a visual representation of one or more formatting options, the visual representation of one or more formatting options being one or more subcategories of a selected second level category of formatting options, at least one of the second level of categories of formatting options and the visual representation of one or more formatting options being customizable by a user of the graphical user interface,
   wherein at least one of the second level of categories of formatting options and the visual representation of one or more formatting options being customizable by a user of the graphical user interface includes the step of allowing a visual representation of one or more formatting options to be repositioned on the display relative to other visual representations of formatting options.

10. A method as recited in claim 9, at least one of the second level of categories of formatting options and the visual representation of one or more formatting options being customizable by a user of the graphical user interface comprising the step of allowing a second level of categories of formatting options to be repositioned on the display relative to others of the second level of categories of formatting options.

11. A method as recited in claim 9, at least one of the second level of categories of formatting options and the visual representation of one or more formatting options being customizable by a user of the graphical user interface comprising the step of allowing a user to add additional visual representations of additional formatting options to the graphical user interface.

12. A computer-readable medium having computer-executable instructions for programming a processor to perform a method of providing a graphical user interface on a display, the graphical user interface provided in one or more of a word processing application program, a spreadsheet application program and a presentation application program, the method comprising the steps of:

(a) displaying a first level of categories of formatting options;

(b) displaying a second level of categories of formatting options, the second level of categories of formatting options being subcategories of a selected first level category of formatting options; and (c) displaying visual representations of formatting options, the visual representations of formatting options being subcategories of a selected second level category of formatting options, at least one of the second level of categories of formatting options and the visual representations of formatting options being customizable by a user of the graphical user interface to allow a user to add additional visual representations of additional formatting options to the graphical user interface.

13. A computer-readable medium as recited in claim 12, the method further comprising the step of providing a scrolling feature allowing a user to scroll through groups of the visual representations of formatting options.

14. A computer-readable medium as recited in claim 12, the method further comprising the step of highlighting a visual representation of a formatting option when crossed over by a cursor driven by a user interface selection device.

15. A computer-readable medium as recited in claim 12, the second level of categories of formatting options and the visual representations of formatting options being customizable by a user of the graphical user interface comprising the step of allowing the second level of categories of formatting options to be repositioned on the display relative to others of the second level of categories of formatting options, and/or allowing a visual representation of a formatting option to be repositioned on the display relative to other visual representations of formatting options.

16. A computer-readable medium as recited in claim 12, wherein changes made to the graphical user interface for one of the application programs is incorporated into the graphical user interface of at least one other application program.

* * * * *